Aug. 29, 1967 TOKIO NAKANISHI ET AL 3,338,584
REMOVABLE COVER FOR BEARING UNIT
Filed Sept. 30, 1964

INVENTORS
Tokio Nakanishi
Shunji Yagi

BY *Rommel, Alurin & Rommel*

ATTORNEYS

U nited States Patent Office 3,338,584
Patented Aug. 29, 1967

3,338,584
REMOVABLE COVER FOR BEARING UNIT
Tokio Nakanishi and Shunji Yagi, Osaka, Japan, assignors to The Toyo Bearing Manufacturing Company, Limited, Osaka, Japan, a corporation of Japan
Filed Sept. 30, 1964, Ser. No. 400,351
2 Claims. (Cl. 277—184)

This invention relates to a removable cover for a bearing unit, such as a double dust guard-containing unit. The removable cover carries means cooperating with the housing of the bearing unit for detachable connection with the latter and oil seal means having portions in intimate engagement with a shaft.

The main object of this invention is to slightly modify the housing of the bearing unit and provide a readily detachable and replaceable cover or closure therefor, which will not be apt to drop off due to vibration during the operation of the shaft associated with the bearing unit. The cover is easily removed from the housing by the use of a conventional prying means.

Another object of this invention is to provide a cover as described having an oil seal which has great sealing effect under irregular load on the bearing unit and shaft when in operation.

Other objects and advantages of the invention will be apparent during the course of the following detailed description of the invention taken in connection with the accompanying drawings, forming a portion of this disclosure and in which drawing.

Figure 1:
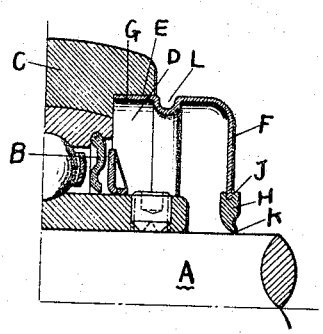
FIG. 1 is a fragmentary vertical sectional view of a conventional bearing unit with dust guard and a conventional cover therefor.

In the drawing, wherein for the purpose of illustration is shown an embodiment of our invention, similar reference characters designate corresponding parts throughout the several views and, in FIG. 1, the letter A designates a shaft which is mounted for rotation upon a bearing unit which includes the bearing housing C which carries a double dust guard assembly B outwardly of which is a cylindrical mouth E of the housing C closed by the cover F which has the cylindrical skirt portion G within the mouth E, while the outer cover plate J contains the oil seal H including the shaft-contacting ring-like member or lip K, while, in FIGS. 2 to 6 inclusive, somewhat similar parts are designated by the reference characters A', B', C', E', F', and H'.

As may be seen in FIG. 1, the conventional skirt portion G of the cover F simply has a frictional engagement with the wall of the mouth E and frequently becomes detached from the housing C due, in part, to centrifugal force, vibrations, and slippage; and the oil seal H incorporates a simple ring-like member K. Experience has demonstrated that friction and vibration tend to cause this ring-like member or lip K to become distorted or detached from the cover plate J, thus ruining its effectiveness.

Figure 2:
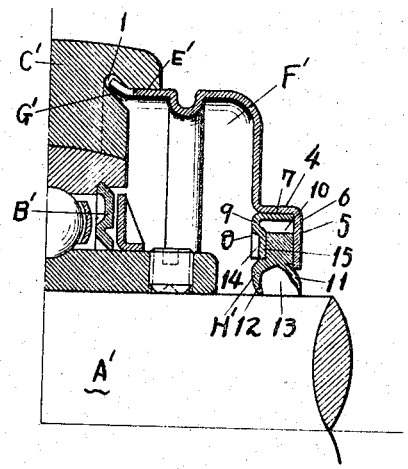
FIG. 2 is a fragmentary vertical sectional view of a preferred embodiment of our invention for comparison with FIG. 1.
Figure 3:
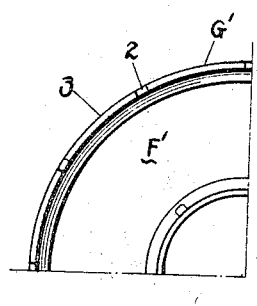
FIG. 3 is a fragmentary end elevational view of the cover of the invention looking toward its open end.
Figure 4:
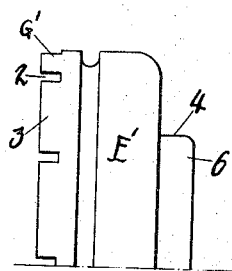
FIG. 4 is a fragmentary side elevational view of the cover of FIGS. 2 and 3.
Figure 5:
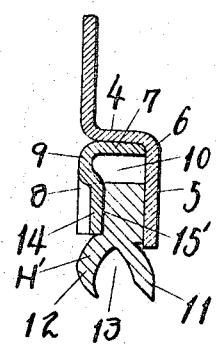
FIG. 5 is an enlarged vertical sectional view of the new oil seal of this invention and associated structure, along the lines of FIG. 2.
Figure 6:
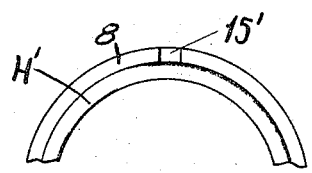
FIG. 6 is a fragmentary end plan view of a portion of the oil seal of FIG. 5.

This invention is intended to remedy the above-described defects since the skirt G' of cover F' has a plurality of outwardly-flaring spaced apart flange portions 3, which are segments of a circle, of spring material (several of which are shown in FIG. 3) which are adapted to extend into a circular groove 1 in the wall of the housing C' as shown in FIG. 2, to resiliently engage the wall of the groove 1 and prevent accidental detachment of the cover F' from the housing C'. However, when it is desired to remove the cover F' it may be detached with some effort and replaced thereafter, the flange portions 3 sliding over the wall of the mouth E' and springing into the groove 1. Thus, there are both the frictional contact of the skirt portion G' with the wall of the mouth E' and also the retaining efforts of the flange portions 3 within the groove 1.

As described above in this specification the oil seal H' is carried by the hanging edge of the cover F' which has an outwardly offset circular wall 4, from the outer ends of which extends, toward the axis of the shaft A', a circular wall or flange 5, which has an edge spaced from the periphery of the shaft, as shown in FIG. 2. Secured, as by conventional welding, to the inner face of the offset circular wall 4 is a flange 7 from which extends a flange or wall 8 toward the axis of the shaft A'. The flange 7 is in substantial parallelism with the wall or flange 5, although the juncture of the flange 7 and wall 8 is arched to provide a somewhat springy connection 9 between the flange 5 and wall 8. The wall 8 may be provided with a slot 15' (FIG. 6) for a purpose later described.

Frictionally retained within the groove 15 is the inner ring-like portion of the oil-retaining element of the oil seal H' from which inner ring-like portion projects a bifurcated lip consisting of the spaced-apart lip portions 11 and 12 and defining a groove 13 to receive oil or grease. The oil-retaining element may be of rubber and the free ends of the lip portions 11 and 12 are adapted to contact the periphery of the shaft A'. As may be seen in FIGS. 2 and 5, there is a space 10 between the inner end face of the inner ring-like portion of the oil-retaining element of the oil seal H' and the flange 7 which functions as a space for air which may be under some pressure as the element is forced into the groove 15, and tends to both cushion the element and force it against the shaft. An outwardly extending rib 14 carried by the inner ring-like portion of the oil-retaining element of the seal H' is adapted to extend into the slot 15' and prevent rotation of the seal H'.

It is particularly desirable, as shown in FIG. 2, that two lips 11 and 12 from the outer part and mouth of the oil seal H' and the groove 13 between these two lips 11 and 12 should be stuffed with grease. In so doing excellent sealing effect can be obtained.

Various changes may be made to the form of the invention herein shown and described without departing from the spirit of the invention or scope of the following claims:

What is claimed is:

1. A removable cover for sealing an end of a bearing unit for a shaft, said bearing unit having a housing provided with a substantially cylindrical mouth with an inner diameter spaced from a portion of said shaft and a substantially circular groove at the inner end of said mouth and in communication therewith; said cover having a substantially vertical plate cover portion, a cylindrical skirt portion of springy material extending from said plate cover portion in contact with the wall of said mouth and extending well beyond the outer end of said mouth and a plurality of spaced-apart outwardly-flaring segmental flange portions carried by the skirt portion at the inner end thereof, said flange portions being of springy material, whereby when the skirt portion of said cover is being inserted into said mouth said flange portions will slide over the wall of said mouth and spring into said groove to retain said cover on said mouth, said cover plate having an opening for said shaft, the wall of said opening being spaced from the periphery of said shaft, and sealing means carried by said cover plate, said sealing means including a ring provided with two lips in contact with said periphery, whereby a sealing fluid may be carried between said lips.

2. A removable cover for sealing an end of a bearing units for a shaft, said removable cover including a cover plate including a plate portion having an opening for and spaced from said shaft and means to removably secure said removable cover to said bearing unit, said plate portion at said opening having walls defining a peripheral groove, and a ring having a portion extending into said groove, in frictional contact with the wall of said groove, said ring being provided with two freely movable spaced-apart resilient lips extending from said portion wholly outwardly of said groove, and defining a second groove and constructed and arranged for contacting said shaft and for receiving a sealing material to contact said shaft, whereby said lips may move freely, due to misalignment of said shaft, upon rotation of said shaft, said cover being characterized in that said plate portion has an outer face, and an inner face and is disposed substantially vertically when in use, said walls of said peripheral groove including a stepped portion at said opening comprising a substantially horizontal wall and a substantially vertical wall extending from said horizontal wall, said stepped portion being outwardly of the plane of said outer face, and a wall formation substantially L-shaped in transverse section, with one wall thereof secured in face-to-face relationship to said substantially horizontal wall and the other wall thereof paralleling and spaced from said substantially vertical wall.

References Cited

UNITED STATES PATENTS 2,619,369 11/1952 Williams _____ 277—182
3,075,779 1/1963 Holdham _____ 277—186

FOREIGN PATENTS 109,100 11/1939 Australia.

LAVERNE D. GEIGER, *Primary Examiner.*

D. MASSENBERG, *Assistant Examiner.*